ન2,795,590

NEW DERIVATIVES OF DIBENZTHIOPHENE DIOXIDE

Adolf Emil Siegrist, Basel, and Franz Ackermann, Binningen, Switzerland, assignors to Ciba Limited, Basel, Switzerland, a Swiss firm No Drawing. Application October 25, 1954, Serial No. 464,598

Claims priority, application Switzerland November 3, 1953

4 Claims. (Cl. 260—329.3)

This invention provides as new compounds water-soluble derivatives of dibenzthiophene dioxide of the general formula

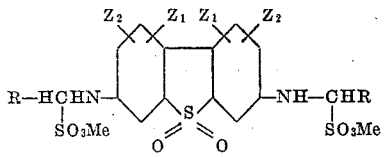

in which $Z_1$ and $Z_2$ represent hydrogen, halogen or an alkyl, alkoxy or sulfonic acid radical, R represents an alkyl, aryl, aralkyl or furfuryl radical, and Me represents a cation.

The compounds of the above formula are yellow and possess a strong fluorescence which is visible in ultraviolet light when the compound is in solution or applied to a substratum. These compounds are also sensitive to treatment with oxidizing agents and to a less extent to treatment with acids, whereby the fluorescence is irreversibly destroyed. Thus, the absence of fluorescence in a substratum which has been impregnated with one of these compounds indicates that it has been subsequently subjected to the action of an oxidizing agent or an acid.

The new derivatives of the above formula are obtained in accordance with the invention by reacting a compound of the general formula

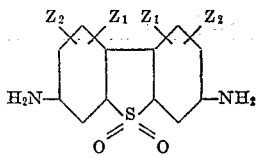

in which $Z_1$ and $Z_2$ have the meanings given above, with an aldehyde-bisulphite compound or with an aldehyde and sulfur dioxide.

As starting materials for preparing these products there come into consideration: Benzidine sulfone, and also its derivatives alkylated, alkoxylated or halogenated in the benzene nuclei, for example, tolidine sulfone, and also sulfonic acids thereof, such as benzidine sulfone sulfonic acids or toluidine sulfone sulfonic acids. These compounds are known or can be made by methods in themselves known.

As aldehydes, which are to be used in the form of bisulfite addition products, or themselves together with sulfur dioxide, there may be mentioned aldehydes of the aliphatic, aromatic araliphatic or heterocyclic series. There may be mentioned, for example: Formaldehyde, acetaldehyde, benzaldehyde, para-chlorobenzaldehyde, cinnamaldehyde and furfural. There is advantageously used formaldehyde or benzaldehyde.

The reaction components are advantageously reacted together with the aid of heat in the presence of water at a high temperature, for example, 90–100° C., until the condensation product has become soluble in water. In some cases it is necessary to work under superatmospheric pressure. Examples of compounds obtainable by the present process are as follows:

1. 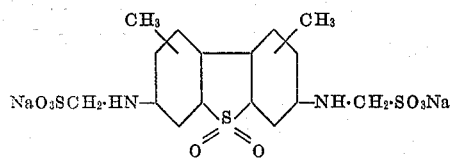

obtainable by the condensation of tolidine sulfone with the addition product of sodium bisulfite and formaldehyde.

2. 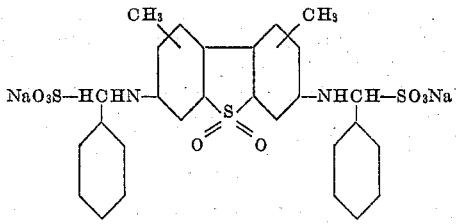

obtainable in a manner analogous to that described for Compound 1 by means of the corresponding benzaldehyde-bisulfite compound.

The new products of this invention may be used by impregnating the material to be treated with a solution, especially an aqueous solution, of the compound in question, and subsequently centrifuging or squeezing the material and drying it. The compounds of the invention may also be incorporated with the material to be treated in the course of the manufacture of the latter, for example, by adding the compound to a paper pulp.

As materials which can be treated there may be mentioned the following:

Textile materials in general, which may be in the form of fibers, threads, yarns, woven or knitted goods or felt, and finished articles made therefrom. The textile materials may be composed of natural materials of animal origin such as wool or silk, or of vegetable origin, such as cellulose material composed of cotton, hemp, flax, linen or ramie, and also semi-synthetic materials such as regenerated cellulose, for example, artificial silks, viscoses, including staple fibers, or synthetic materials which are obtainable by polymerization or copolymerization, or are obtainable by polycondensation, such as polyesters and above all polyamides, such as nylon.

There may also be treated fibrous materials of other kinds, which are not textile materials, and which may be of animal origin, such as feathers, hair, pelts and leather, or of vegetable origin, such as straw, wood, wood pulp or fibrous materials consisting of compressed fibers, such as paper, pasteboard or compressed wood, and also finished articles made therefrom.

Finally, there may also be treated films, lacquers and resins of artificial materials of semi-synthetic or synthetic origin, such as foils of regenerated cellulose.

The material to be treated may be undyed, dyed or printed.

The following examples illustrate the invention, the parts being by weight unless otherwise stated, and the relationship of parts by weight to parts by volume being the same as that of the kilogram to the liter:

Example 1

A formaldehyde-bisulfite solution is prepared from 1040 parts of sodium bisulfite solution of 40 percent strength and 324 parts of an aqueous formaldehyde solution of 37 percent strength. 274 parts of tolidine sulfone are then added, while stirring, and the mixture is heated under reflux. As soon as the reaction mixture has become thickly liquid, there are added in portions 500–750 parts of water. After stirring for 6-8 hours an almost entirely clear solution is obtained. It is then filtered while hot to remove traces of insoluble constituents. The solution is then cooled, sodium chloride is added to complete the precipitation, the mixture is filtered, and the filter residue is washed with an aqueous solution of sodium chloride and dried. The resulting disodium salt of 3:7-bis-(sulfomethylamino)-dimethyl-dibenzthiophene - 5 - dioxide of the formula

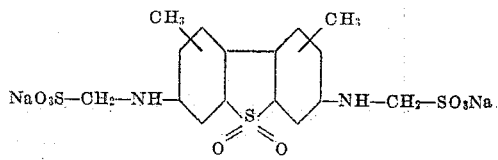

is a bright yellow powder, which is soluble in water. A substratum which has been impregnated with an aqueous solution of this product exhibits a brilliant yellow fluorescence in ultraviolet rays.

Products having similar properties are obtained by using in this example, instead of formaldehyde, benzaldehyde, acetaldehyde or cinnamaldehyde.

*Example 2*

A furfural-bisulfite solution is prepared from 130 parts of sodium bisulfite solution of 40 percent strength, 48.0 parts of freshly distilled furfural and 75 parts of water, and 50 parts of sodium carbonate solution of 10 percent strength are cautiously added. 246 parts of benzidine sulfone are then added, while stirring, and the whole is boiled under reflux. After 3 hours, the mixture is filtered while hot to remove traces of a dark by-product, the filtrate is stirred for several hours while cooling with ice water, the precipitated condensation product is filtered off and washed with a small amount of ice-water and dried. The resulting disodium salt of 3:7-bis-(sulfo-furfuryl-amino)-dibenzthiophene-5-dioxide of the formula

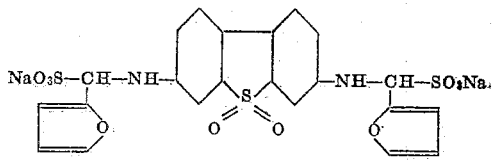

is a bright yellow powder which is soluble in water. When a substratum is impregnated with a solution of the product, it exhibits a bright yellow fluorescence in ultraviolet rays.

What we claim is:

1. A water-soluble yellow derivative of dibenzthiophene dioxide, which exhibits a yellow fluorescence in ultra-violet light and corresponds to the general formula

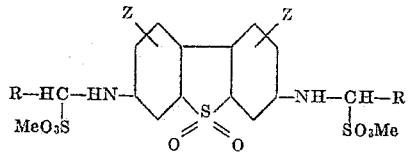

in which Z represents a member selected from the group consisting of hydrogen and methyl, R represents a member selected from the group consisting of hydrogen, lower alkyl, phenyl, phenyl-ethenyl and furfuryl, and Me stands for an alkali metal.

2. The compound of the formula

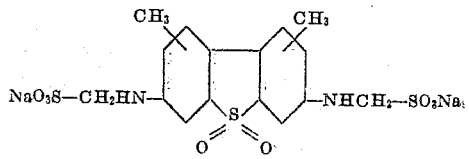

3. The compound of the formula

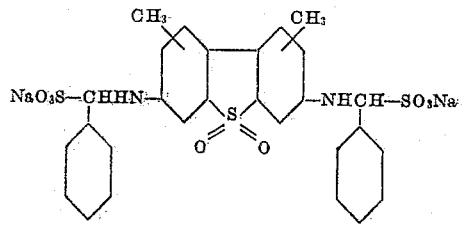

4. The compound of the formula

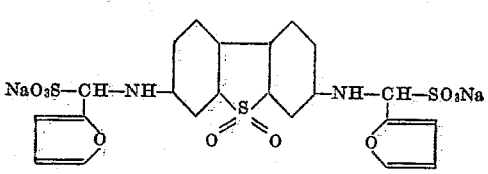

References Cited in the file of this patent
UNITED STATES PATENTS
2,563,493     Scalera et al. _____ Aug. 7, 1951